United States Patent
Shahar et al.

(10) Patent No.: US 10,156,645 B2
(45) Date of Patent: Dec. 18, 2018

(54) SYSTEMS AND METHODS FOR SUB-PIXEL LOCATION DETERMINATION AT SIDEWALLS AND CORNERS OF DETECTORS

(71) Applicant: General Electric Company, Schenectady, NY (US)

(72) Inventors: Arie Shahar, Moshav Magshimim (IL); Jean-Paul Bouhnik, Zichron Yaacov (IL)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/389,956

(22) Filed: Dec. 23, 2016

(65) Prior Publication Data
US 2018/0180748 A1    Jun. 28, 2018

(51) Int. Cl.
 *G01T 1/24* (2006.01)
(52) U.S. Cl.
 CPC .............. *G01T 1/246* (2013.01); *G01T 1/241* (2013.01)
(58) Field of Classification Search
 CPC ......... G01T 1/241; G01T 1/246; G01T 1/202; G01T 1/366; G01T 1/20
 USPC ................................................... 250/370.09
 See application file for complete search history.

(56) References Cited

U.S. PATENT DOCUMENTS

| | | | |
|---|---|---|---|
| 4,421,986 A | 12/1983 | Friauf et al. | |
| 4,852,135 A | 7/1989 | Anisovich et al. | |
| 5,148,809 A | 11/1992 | Biegeleisen-Knight et al. | |
| 5,245,191 A | 9/1993 | Barber et al. | |
| 5,273,910 A | 12/1993 | Tran et al. | |
| 5,504,334 A | 4/1996 | Jansen et al. | |
| 5,562,095 A | 10/1996 | Downey et al. | |
| 5,754,690 A | 5/1998 | Jackson et al. | |
| 5,771,308 A | 6/1998 | Florent | |
| 5,825,033 A | 10/1998 | Barrett et al. | |
| 5,847,398 A | 12/1998 | Shahar et al. | |
| 6,002,714 A | 12/1999 | Eisen et al. | |
| 6,034,373 A * | 3/2000 | Shahar | H01L 27/14676 250/338.4 |
| 6,169,287 B1 | 1/2001 | Warburton | |
| 6,618,185 B2 | 9/2003 | Sandstrom | |
| 6,765,213 B2 * | 7/2004 | Shahar | G01T 1/2928 250/370.01 |

(Continued)

FOREIGN PATENT DOCUMENTS

WO    2014173812 A1    10/2014

OTHER PUBLICATIONS

"Charge Transport in Arrays of Semiconductor Gamma-Ray Detectors," H.H. Barrett, Physical Review Letters, vol. 75, No. 1, Jul. 1995.

(Continued)

*Primary Examiner* — Taeho Jo
(74) *Attorney, Agent, or Firm* — Dean D. Small; The Small Patent Law Group, LLC

(57) ABSTRACT

A radiation detector system is provided that includes a semiconductor detector, plural pixelated anodes, and a side anode. The semiconductor detector has a surface. The pixelated anodes are disposed on the surface, and are arranged in a grid defining a footprint. The side anode is disposed outside of the footprint defined by the plural pixelated anodes, and has a length extending along at least two of the pixelated anodes.

20 Claims, 8 Drawing Sheets

(56) References Cited

U.S. PATENT DOCUMENTS

| | | | |
|---|---|---|---|
| 6,928,144 B2* | 8/2005 | Li | A61B 6/032 |
| | | | 250/370.09 |
| 7,009,183 B2* | 3/2006 | Wainer | G01T 1/172 |
| | | | 250/370.09 |
| 7,187,790 B2 | 3/2007 | Sabol et al. | |
| 7,495,228 B1 | 2/2009 | Albagli et al. | |
| 7,508,509 B2 | 3/2009 | Lehitkoski et al. | |
| 7,490,085 B2 | 8/2009 | Waiker et al. | |
| 7,695,156 B2 | 4/2010 | Nagarkar | |
| 8,067,744 B2* | 11/2011 | Blevis | G01T 1/241 |
| | | | 250/370.01 |
| 8,405,038 B2 | 3/2013 | Bouhnik et al. | |
| 9,002,084 B2 | 4/2015 | Shahar et al. | |
| 9,482,764 B1* | 11/2016 | Shahar | G01T 7/005 |
| 2002/0036269 A1* | 3/2002 | Shahar | G01T 1/2928 |
| | | | 250/370.1 |
| 2003/0099026 A1 | 5/2003 | Sandstrom | |
| 2003/0128324 A1 | 7/2003 | Woods et al. | |
| 2004/0195512 A1 | 10/2004 | Crosetto | |
| 2005/0139777 A1 | 6/2005 | Rostaing et al. | |
| 2006/0086913 A1 | 4/2006 | Spahn | |
| 2006/0285751 A1 | 12/2006 | Wu et al. | |
| 2007/0007457 A1* | 1/2007 | Blevis | G01T 1/2018 |
| | | | 250/370.09 |
| 2007/0023669 A1 | 2/2007 | Hefetz et al. | |
| 2008/0149842 A1 | 6/2008 | El-Hanany et al. | |
| 2009/0110144 A1 | 4/2009 | Takahashi et al. | |
| 2009/0224167 A1* | 9/2009 | Blevis | G01T 1/241 |
| | | | 250/370.13 |
| 2009/0236535 A1* | 9/2009 | Soldner | H01J 47/08 |
| | | | 250/370.13 |
| 2010/0148082 A1* | 6/2010 | Du | G01T 1/00 |
| | | | 250/370.09 |
| 2010/0252744 A1* | 10/2010 | Herrmann | G01T 1/241 |
| | | | 250/370.14 |
| 2011/0108703 A1* | 5/2011 | Dorfan | H01L 27/1446 |
| | | | 250/208.1 |
| 2011/0155918 A1* | 6/2011 | Bouhnik | G01T 1/249 |
| | | | 250/370.14 |
| 2013/0108019 A1* | 5/2013 | Tkaczyk | G01T 1/247 |
| | | | 378/62 |
| 2013/0126998 A1* | 5/2013 | Shahar | H01L 31/085 |
| | | | 257/428 |
| 2013/0193337 A1* | 8/2013 | Bouhnik | G01T 1/249 |
| | | | 250/370.14 |
| 2014/0284489 A1* | 9/2014 | Engel | G01T 1/241 |
| | | | 250/370.09 |
| 2015/0069252 A1* | 3/2015 | Eichenseer | G01T 1/20 |
| | | | 250/370.09 |
| 2015/0194459 A1* | 7/2015 | Rusian | H01L 31/085 |
| | | | 257/428 |
| 2015/0216485 A1* | 8/2015 | Ergler | A61B 6/4233 |
| | | | 378/19 |
| 2016/0126402 A1* | 5/2016 | Shahar | G01T 1/24 |
| | | | 257/428 |
| 2017/0016998 A1* | 1/2017 | Shahar | G01T 1/241 |

OTHER PUBLICATIONS

"Signals Induced in Semiconductor Gamma-Ray Imaging Detectors," J.D. Eskin, Journal of Applied Physics, vol. 85, No. 2, Jan. 1999.

"High-Resolution p-i-n CdTe and CdZnTe X-Ray Detectors with Cooling and Rise-Time Discrimination," A. Niemela, IEEE Transactions on Nuclear Science, vol. 43, No. 3, Jun. 1996.

International Search Report and Written Opinion dated Jul. 15, 2016 for corresponding PCT Application No. PCT/US2016/029465, Filed Apr. 27, 2016; 11 pages.

Warburton; An approach to Sub-Pixel Spatial Resolution in Room Temperature X-Ray Detector arrays with Good Energy Resolution; X-Ray Instrumentation Associates (XIA); 5 pages.

Kim, J. C., et al., "Improvement of Sub-Pixel Position Sensing in Nonuniform Large-Volume Pixelated CdZnTe Crystals," IEEE Transactions on Nuclear Science, vol. 60, Issue 2, pp. 1201-1207 (Apr. 2013).

Extended European Search Report and Opinion issued in connection with corresponding EP Application No. 17206675.5 dated May 11, 2018.

* cited by examiner

SYSTEMS AND METHODS FOR SUB-PIXEL LOCATION DETERMINATION AT SIDEWALLS AND CORNERS OF DETECTORS

BACKGROUND

The subject matter disclosed herein relates generally to medical imaging systems, more specifically to radiation detectors for ionizing radiation, such as X-Ray and Gamma Rays and even more particularly to identifying sub-pixel locations for events.

In nuclear medicine (NM) imaging, such as single photon emission computed tomography (SPECT) or positron emission tomography (PET) imaging, radiopharmaceuticals are administered internally to a patient. Detectors (e.g., gamma cameras), typically installed on a gantry, capture the radiation emitted by the radiopharmaceuticals and this information is used, by a computer, to form images. The NM images primarily show physiological function of, for example, the patient or a portion of the patient being imaged.

The detectors may include an array of pixelated anodes. Improved resolution may be obtained by determining sub-pixel locations of events. Generally, in order to obtain a sub-pixel position of an event inside a pixel, non-collecting signals of the event at the 4 pixels immediately adjacent to the pixel within which the event occurs may be used. However, for a pixel located at a sidewall, there are only 3 pixels immediately adjacent to the pixel, and for a pixel located at a corner, there are only 2 pixels immediately adjacent to the pixel, resulting in incomplete information for sub-pixel location determination.

BRIEF DESCRIPTION

In accordance with an embodiment, a radiation detector system is provided including a semiconductor detector, plural pixelated anodes, and a side anode. The semiconductor detector has a surface. The pixelated anodes are disposed on the surface, and are arranged in a grid defining a footprint. The side anode is disposed outside of the footprint defined by the plural pixelated anodes, and has a length extending along at least two of the pixelated anodes.

In accordance with another embodiment, a method is provided that includes acquiring charge event information with a radiation detector that includes plural pixelated anodes disposed on a surface of the radiation detector, with the pixelated anodes defining a grid having a footprint. The method also includes generating, for a charge event, charge signals that include a collected charge signal corresponding to a charge collected by a pixelated anode and a non-collected charge signal corresponding to a charge collected by a side anode. The side anode is disposed outside of the footprint defined by the plural pixelated anodes and has a length extending along at least two of the pixelated anodes. Further, the method includes determining, with at least one processor, a collected value for the collected charge signal in the pixelated anode, and determining, with the at least one processor, a non-collected value for the non-collected charge signal generated by the side anode. Also, the method includes using the non-collected value for the non-collected charge signal to determine a sub-pixel location for the pixelated anode. The method also includes using the collected value to count a single event in the pixelated anode.

In accordance with another embodiment, a method is provided that includes providing plural pixelated anodes on a surface of a semiconductor. The plural pixelated anodes are arranged in a grid defining a footprint. The method also includes providing a side anode on the semiconductor. The side anode is disposed outside of the footprint defined by the plural pixelated anodes and has a length extending along at least two of the pixelated anodes.

DETAILED DESCRIPTION

Figure 1:
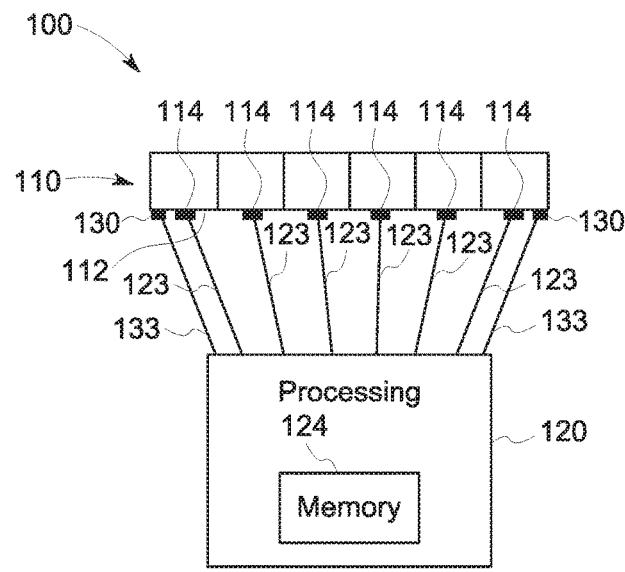
FIG. 1 provides a schematic view of a radiation detector system according to an embodiment.

The foregoing summary, as well as the following detailed description of certain embodiments and claims, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors, controllers or memories) may be implemented in a single piece of hardware (e.g., a general purpose signal processor, ASIC, FPGA, or random access memory, hard disk, or the like) or multiple pieces of hardware. Similarly, the programs may be stand alone programs, may be incorporated as subroutines in an operating system, may be functions in an installed software package, and the like. It should be understood that the various embodiments are not limited to the arrangements and instrumentality shown in the drawings.

As used herein, the terms "system," "unit," or "module" may include a hardware and/or software system that operates to perform one or more functions. For example, a module, unit, or system may include a computer processor, controller, or other logic-based device that performs operations based on instructions stored on a tangible and non-transitory computer readable storage medium, such as a computer memory. Alternatively, a module, unit, or system may include a hard-wired device that performs operations based on hard-wired logic of the device. Various modules or units shown in the attached figures may represent the hardware that operates based on software or hardwired instructions, the software that directs hardware to perform the operations, or a combination thereof.

"Systems," "units," or "modules" may include or represent hardware and associated instructions (e.g., software stored on a tangible and non-transitory computer readable storage medium, such as a computer hard drive, ROM, RAM, or the like) that perform one or more operations described herein. The hardware may include electronic circuits that include and/or are connected to one or more logic-based devices, such as microprocessors, processors, controllers, or the like. These devices may be off-the-shelf devices that are appropriately programmed or instructed to perform operations described herein from the instructions described above. Additionally or alternatively, one or more of these devices may be hard-wired with logic circuits to perform these operations.

As used herein, an element or step recited in the singular and preceded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Various embodiments provide systems and methods for determining sub-pixel locations for radiation events for pixelated anodes (or pixels) located at sidewall and/or corner positions. Various embodiments may be used, for example, in applications utilizing pinhole collimators. For a pinhole collimator, the intrinsic resolution may be multiplied by system magnification. Accordingly, reducing the intrinsic resolution (e.g., via accurate sub-pixel locations) may be very beneficial for pinhole collimators. As another example, various embodiments may improve the spatial resolution for a Compton camera, in which system spatial resolution may be quite sensitive to event location accuracy.

A technical effect of at least one embodiment includes improved image quality (e.g., due to more accurate or reliable counting of events). A technical effect of at least one embodiment includes improved determination of sub-pixel locations for radiation events. A technical effect of at least one embodiment includes improved signal to noise ratio and improved energy resolution. A technical effect of at least one embodiment includes reduction or elimination of random-coincidence errors from information from neighboring pixels. A technical effect of at least one embodiment includes improved derivation of sub-pixel positioning for pixels located along sides or corners of a detector footprint. A technical effect of at least one embodiment includes determination of sub-pixel locations with a reduced number of electronic channels (e.g., due to the use of a common side or non-collecting electrode for several pixels).

Figure 2:
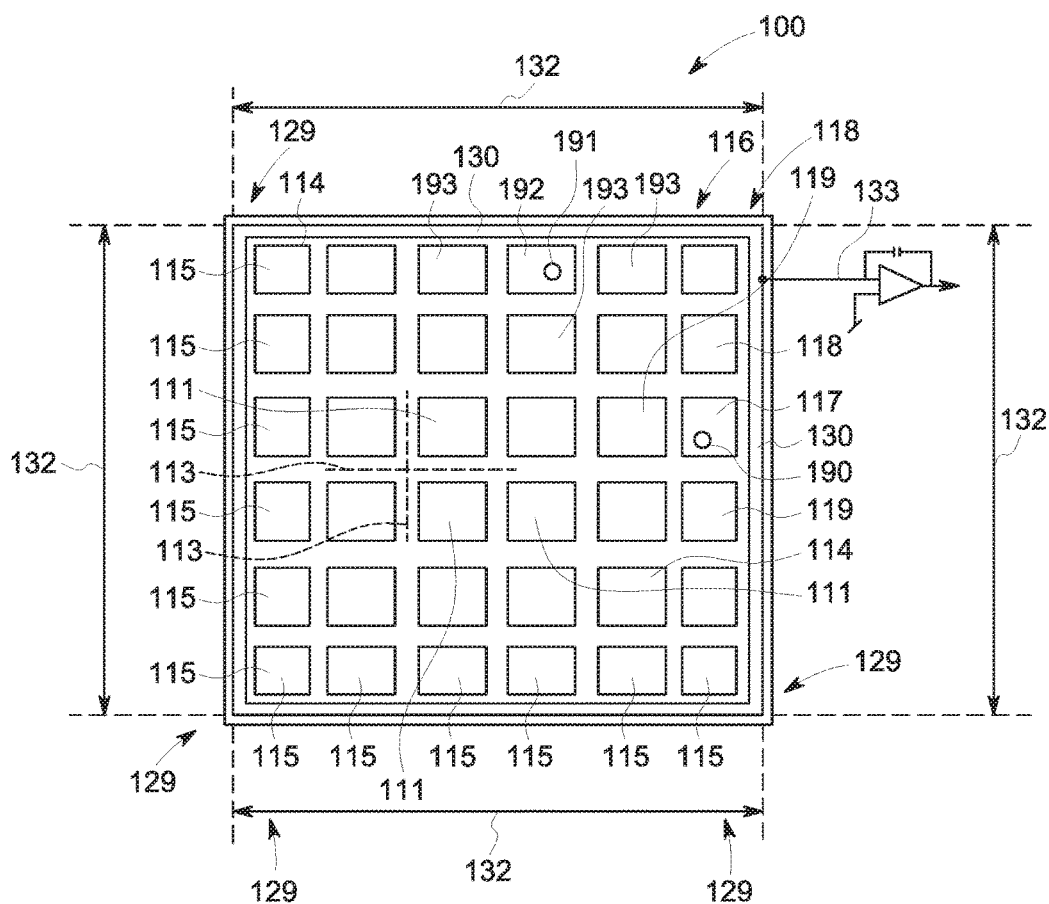
FIG. 2 provides a plan view of a semiconductor detector of the radiation detector system of FIG. 1.

FIG. 1 provides a schematic view of a radiation detector system 100 in accordance with various embodiments. As seen in FIG. 1, the radiation detector system 100 includes a semiconductor detector 110 (FIG. 2 provides a plan view of the anodes of the semiconductor detector 110) and a processing unit 120. The semiconductor detector 110 has a surface 112 on which plural pixelated anodes 114 are disposed. In various embodiments a cathode (not shown in FIG. 1) may be disposed on a surface opposite the surface 112 on which the pixelated anodes 114 are disposed. For example, a single cathode may be deposited on one surface with the pixelated anodes 114 disposed on an opposite surface. Generally, radiation (e.g., one or more photons) penetrates via the cathode and is absorbed in the volume of detector 110 under the surface 112 and pixelated anodes 114. The semiconductor detector 110 generates electrical signals corresponding to the radiation mentioned above. The pixelated anodes 114, as illustrated by FIG. 2, are arranged in a grid 116 defining a footprint 118 (e.g., an area defined by the outline or perimeter of the grid 116). In the illustrated embodiment, the pixelated anodes 114 are shown in a grid 116 arranged as a 6×6 array for a total of 36 pixelated anodes 114; however, it may be noted that other numbers or arrangements of pixelated anodes may be used in various embodiments. Each pixelated anode 114, for example, may have a surface area of 2.5×2.5=6.25 millimeters square; however, other sizes and/or shapes may be employed in various embodiments. As discussed herein, the size and/or pitch of the anodes 114 may vary. As seen in FIG. 2, the pixelated anodes 114 are separated by charge sharing lines 113 or split lines. A charge sharing line may be understood as corresponding to a location for portions of a charge cloud passing therethrough will be detected by adjacent pixels sharing the charge sharing line as the electron cloud passes from the cathode to the anodes. Put another way, for an electron cloud having at least a portion thereof located along a charge sharing line or path, a portion of the electron cloud will be detected by one anode disposed along the charge sharing line as the cloud passes from the cathode to the anode, while another portion of the electron cloud will be detected by the other or adjacent anode as the electron cloud passes from the cathode to the anode. For additional discussion regarding charge sharing events and sub-pixel location determinations, see U.S. patent application Ser. No. 14/627,436, entitled "Systems and Methods for Improving Energy Resolution by Sub-Pixel Energy Calibration," filed 20 Feb. 2015; U.S. patent application Ser. No. 14/724,022, entitled "Systems and Methods for Charge-Sharing Identification and Correction Using a Single Pixel," filed 28 May 2015; and U.S. patent application Ser. No. 15/280,640, entitled "Systems and Methods for Sub-Pixel Location Determination," filed 29 Sep. 2016, which are hereby incorporated by reference in their entirety. The case of charge sharing may cause to a similar effect as in the case of non-collecting signal, i.e. production of two simultaneous signals appearing in two adjacent pixels. Methods or techniques for distinguishing between charge sharing and non-collecting events is discussed herein as well as in the above referenced applications incorporated by reference.

The semiconductor detector 110 in various embodiments may be constructed using different materials, such as semiconductor materials, including Cadmium Zinc Telluride (CdZnTe), often referred to as CZT, Cadmium Telluride (CdTe), and Silicon (Si), among others. The semiconductor detector 110 may be configured for use with, for example, nuclear medicine (NM) imaging systems, positron emission tomography (PET) imaging systems, and/or single photon emission computed tomography (SPECT) imaging systems. It may be noted that the semiconductor 110 depicted in FIG. 2 may represent a full size detector module, or may represent a portion of a module which may be tiled together with other portions to form a full size detector module.

The volumes of the semiconductor detector 110 under pixelated anodes 114 are defined as voxels. For each pixelated anode 114, detector 110 has a corresponding voxel. The absorption of a photon by a certain voxel corresponding to a particular pixelated anode 114 results in generation of a signal by the pixelated anode 114.

In the illustrated embodiment, at least some of the pixelated anodes 114 generate different signals depending on the location of where a photon is absorbed in the volume of detector 110 under the surface 112. For example, in some embodiments, each pixelated anode 114 generates a collected charge signal corresponding to charge collected by the pixelated anode 114, and generates a non-collected charge signal corresponding to charge collected by an adjacent anode. A collected charge signal may be understood as a signal generated responsive to all or a portion of an electron cloud passing from the cathode to the anode that is eventually collected by a given pixelated anode, while a non-collected charge signal may be understood as a signal generated responsive to a portion of an electron cloud passing from the cathode to the anode that is eventually collected by an adjacent pixelated anode.

The radiation detector system 100 also includes a side anode 130. The side anode 130 is disposed outside of the footprint 118 defined by the grid 116 of the pixelated anodes 114. The side anode 130 has a length 132. In various embodiments, the length 132 extends along at least two of the pixelated anodes 114. In the embodiment depicted in FIG. 2, a single side anode 130 surrounds all of the pixelated anodes 114, and the length of the side anode 130 is the sum of lengths 132 extending along all of the pixelated anodes 114 located at edges 129 of the footprint 118. Edge pixelated anodes 115 may be understood as including those pixelated anodes 114 disposed adjacent to the side anode 130 (or adjacent to a side anode in embodiments including more than side anode). In the illustrated embodiment, the side anode 130 is configured to generate a supplemental non-collected charge signal corresponding to a charge collected by an adjacent anode to the side anode 130 (in the illustrated embodiment, an edge pixelated anode 115). In various embodiments side anode 130 may operate as a non-collecting anode when it is biased by a potential that is lower than the potential in which anodes 115 are biased with. In some embodiments, when the side anode 130 is formed on an electrically insulative layer, such as a passivation or an encapsulation layer, the side anode 130 may operate as non-collecting anode as well.

In the illustrated embodiment of FIG. 1, the processing unit 120 is operably coupled separately to each of the pixelated anodes 114 of the semiconductor detector 110 via corresponding pathways (or channels) 123, and is operably coupled to the side anode 130 via pathway (or channel) 133. The depicted processing unit 120 is configured (e.g., may include one or more ASIC's and/or FPGA's, and/or includes or is associated with a tangible and non-transitory memory having stored thereon instruction configured to direct the processor) to use the side anode 130 to determine sub-pixel locations for events occurring along the edges of the semiconductor 110. For example, a radiation event 190 (see FIG. 2) may occur in pixelated anode 117 (one of the edge pixelated anodes 115). The depicted processing unit 120 is configured to determine a collected value for a collected charge signal in the pixelated anode 117 disposed adjacent to the side anode 130, and to determine a non-collected value for a corresponding non-collected charge signal in the side anode 130 that corresponds to the charge collected by the pixelated anode 117. The processing unit 120 is also configured to use the non-collected value for the non-collected charge signal from the side anode 130 to determine a sub-pixel location for the pixelated anode 117, and to use the collected value to count a single event in the pixelated anode 117. The sum of counts for all anodes (e.g., pixelated anodes 114) may be used to reconstruct an image.

It may be noted that non-collected values from pixelated anodes adjacent to the pixelated anode 117 may also be used to determine the sub-pixel location. For example, for event 190, a non-collected value from the side anode 130 may be used in conjunction with non-collected values from pixelated anodes 119 (pixelated anodes adjacent to the pixelated anode 117) to determine a sub-pixel location for the event 190 in pixelated anode 117. As another example, for an event 191 in pixelated anode 192, a non-collected value from the side anode 130 may be used in conjunction with non-collected values from pixelated anodes 193 to determine a sub-pixel location for the event 191 in pixelated anode 192. The collected and the non-collected signals appear simultaneously in the collecting pixel and its adjacent pixels, respectively. However, it may be noted that simultaneous signals may also appear as well in collecting pixels and its adjacent pixel, in the cases of charge splitting (charge sharing event) or in the case of random coincidence in which two events occur simultaneously in two or more adjacent pixels. The probability to have random coincidence in more than two adjacent pixels is quite low and will not be addressed here.

In various embodiments, distinguishing between the case of non-collecting signal and shared signal is done as follows: if the combined value of the signals appearing simultaneously in two adjacent pixels satisfies one or more thresholds corresponding to an event having an energy corresponding to a photon impact, the case is related to a shared charge event and may be counted as an event for the corresponding pixelated anode and used in image reconstruction with an assigned sub-pixel location located on a split line (e.g., as shown in FIG. 2). If the value does not satisfy one or more thresholds, the event may be related to the collected signal in the collecting pixel and to the non-collecting signal (much smaller than the collected signal) in the pixel adjacent to the pixel that collects the event. Alternatively, distinguishing between non-collected event and charge-shared event may be based on the fact that the collected event and the non-collected events appear simultaneously in the collecting pixel and in all the pixels adjacent to the pixel that collects the event while the charge-shared event appears simultaneously with the collecting event only in one adjacent pixel, except for the case with very low probability to occur when the photon is absorbed in the area between the corners of the pixels. Due to the low probability of such event to happen, it will not be addressed here. This means that in the case when more than two events appear simultaneously in more than two adjacent pixels, the case is not considered as a charge sharing event.

It may be noted that, in the illustrated embodiment, the side anode 130 extends along each edge pixelated anode 115, and non-collected charge signals from the side anode 130 may be used to determine a sub-pixel location for each of the edge pixelated anodes 115. Timing information may be used to determine for which particular edge pixelated anode of the edge pixelated anodes 115 a given non-collected charge signal from the side anode 130 is to be used. Accordingly, in various embodiments, use of a side anode for generating a non-collecting charge signal allows for sub-pixel location for charge sharing events occurring at pixelated anodes located at corners or sides of a detector, while taking up reduced space and/or electronic channels. The sub-pixel event location in the X direction may be calculated as follows: $\Delta X=[In_1(X)-In_2(X)]/[In_1(X)+In_2(X)]$ when $\Delta X$ is the distance of the event from the center of the collecting pixel along X direction and $In_1(X)$ and $In_2(X)$ are the non-collecting signals measured in the pixels adjacent to the collecting pixel and located on both sides of the collecting pixel along the X direction. Similarly, $\Delta Y=[In_1(Y)-In_2(Y)]/[In_1(Y)+In_2(Y)]$ when $\Delta Y$ is the distance of the event from the center of the collecting pixel along Y direction and $In_1(Y)$ and $In_2(Y)$ are the non-collecting signals measured in the pixels adjacent to the collecting pixel and located on both sides of the collecting pixel along the Y direction.

In various embodiments the processing unit 120 includes processing circuitry configured to perform one or more tasks, functions, or steps discussed herein. It may be noted that "processing unit" as used herein is not intended to necessarily be limited to a single processor or computer. For example, the processing unit 120 may include multiple processors, ASIC's, FPGA's, and/or computers, which may be integrated in a common housing or unit, or which may distributed among various units or housings. It may be noted that operations performed by the processing unit 120 (e.g., operations corresponding to process flows or methods discussed herein, or aspects thereof) may be sufficiently complex that the operations may not be performed by a human being within a reasonable time period. For example, the determination of values of collected and/or non-collected charge signals within the time constraints associated with such signals may rely on or utilize computations that may not be completed by a person within a reasonable time period.

In the illustrated embodiment, the processing unit 120 includes a memory 124. The memory 124 may include one or more computer readable storage media. The memory 124, for example, may store information corresponding to the values of one or more signals, count information for the pixelated anodes, image data corresponding to images generated, results of intermediate processing steps, calibration parameters, or the like. Further, the process flows and/or flowcharts discussed herein (or aspects thereof) may represent one or more sets of instructions that are stored in the memory 124 for direction of operations of the radiation detector system 100.

It may be noted that in various embodiments, the side anode 130 may be used only as a non-collecting anode (e.g., no counts to be used for image reconstruction are accumulated for the side anode 130), and used only for determining sub-pixel locations for the pixelated anodes 115. For example, the processing unit 120 may be configured to determine only non-collected values for the side anode 130, to determine collected and non-collected values for the pixelated anodes 114, and to determine counts (and sub-pixel locations) for the pixelated anodes 114 but not for the side anode 130.

Figure 3:
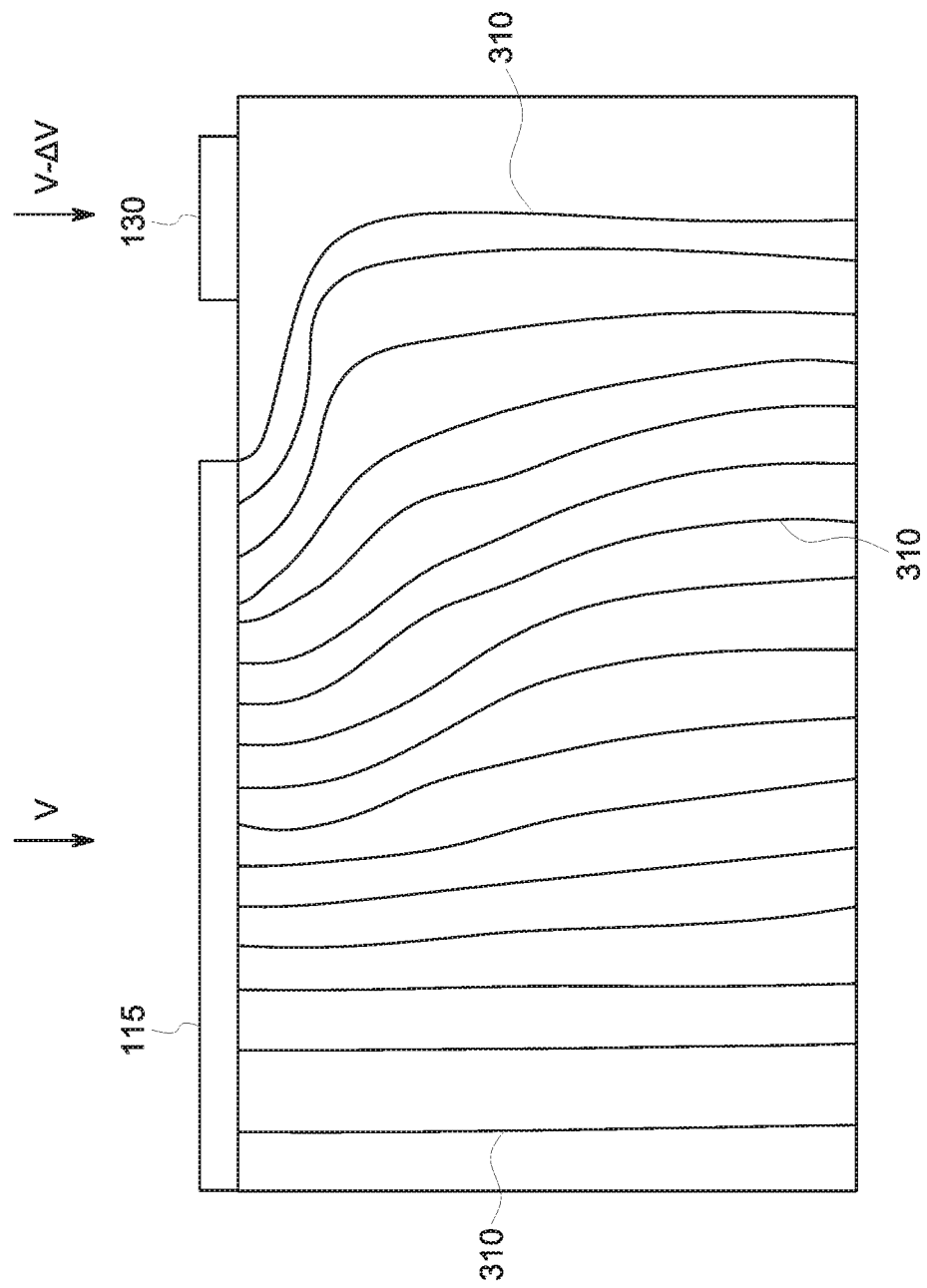
FIG. 3 illustrates example electrical field lines according to an embodiment.

Further, in various embodiments, the side anode 130 has a side anode voltage at which it is operated that is lower than a pixelated anode bias voltage at which the pixelated anodes 114 are operated. For example, for signal integrity, it is desirable that the leakage current in the side anode 130 (or non-collecting electrode) will not exceed the leakage current of a standard pixel. Accordingly, as the area of the side anode 130 may be larger than the area of a standard pixel, the leakage current may be kept relatively low by maintaining the side anode at a bias voltage V−ΔV (where V is the bias voltage of a standard pixel). In such a case, as depicted in FIG. 3, electrical field lines 310, along which the leakage current flows, do not reach the side anode 130, but instead reach an edge pixelated anode 115, helping to maintain the leakage current in the side anode 130.

Returning to FIG. 2, in some embodiments, an edge pitch of the grid 116 for the edge pixelated anodes 115 (e.g., pixels disposed proximate edges 129 of the grid 116) may be lower than a central pitch of the grid 116 for central pixelated anodes 111 disposed proximate a center of the grid 116, for example to provide space for the side anode 130. Pitch, as used herein, may be understood as a distance between centers of adjacent anodes. In some embodiments, the edge pixelated anodes 115 may be smaller than the central pixelated anodes 111, with the pitch maintained constant, to provide space for the side anode 130. It may be noted that in some embodiments, the semiconductor detector material (e.g., CZT) may be diced to its final size prior to application of the anode contacts, and a predetermined photolithography or evaporation mask may be used to produce the contact geometry.

Figure 4:
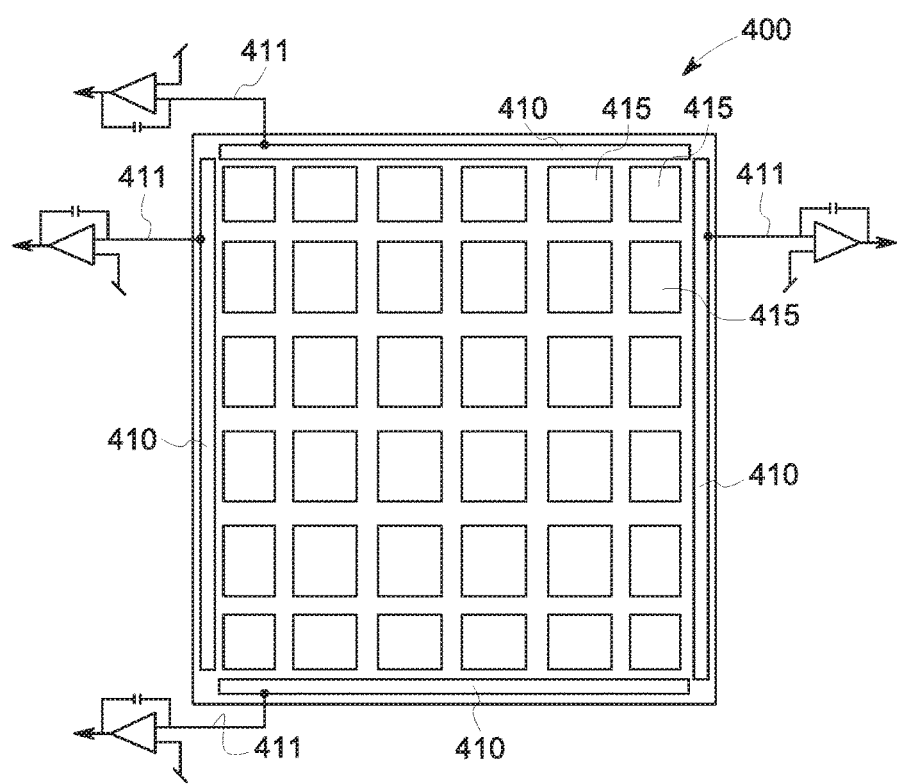
FIG. 4 illustrates an example radiation detector having segmented side anodes according to an embodiment.
Figure 5:
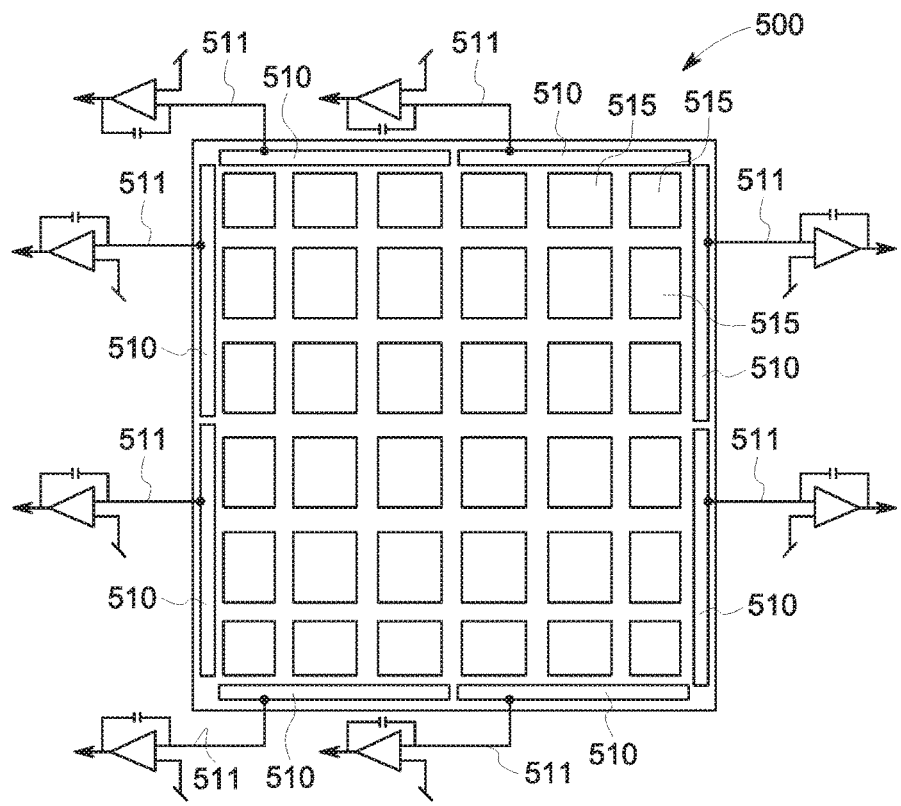
FIG. 5 illustrates an example radiation detector having segmented side anodes according to an embodiment.

It may be noted that in various embodiments, instead of use of only a single side anode, a plurality of segmented side anodes may be employed. For example, use of a relatively long side anode 130 (or non-collecting anode) may result in relatively high leakage current. Further, the longer the side anode 130 (or non-collecting anode) is, or the more pixelated anodes 114 with which the side anode 130 is utilized, the more likely the non-collecting signal is to be affected by random coincidence (e.g., two or more radiation events occurring simultaneously in different edge pixelated anodes 115 associated with the side anode 130). FIGS. 4 and 5 illustrate example radiation detectors having segmented side anodes in accordance with various embodiments.

FIG. 4 provides a schematic plan view of a semiconductor detector 400. The semiconductor detector 400 may be similar in various respects to the semiconductor detector 110 of FIGS. 1 and 2. However, the semiconductor detector 400 includes segmented side anodes 410. In various embodiments, the semiconductor detector 400, for example, may form a part of the detector system 100 of FIG. 1 or be used in conjunction with the detector system 100. Each segmented side anode 410 of the semiconductor detector 400 extends along one side of the semiconductor detector 400, or, for example, along six edge pixelated anodes 415. Each segmented side anode 410 is in electrical communication with a corresponding channel 411. The channels 411 may be used to provide signals from the segmented side anodes 410 to one or more processors (e.g., processing unit 120 of FIG. 1). Each segmented side anode 410 of the embodiment of FIG. 4 is used to generate non-collected charge signals for six pixelated anodes, in contrast to the side anode 130 of FIG. 2 that is used to generate non-collected charge signals for 20 pixelated anodes. Accordingly, the probability of random coincidence is lower for the embodiment depicted in FIG. 4 than for the embodiment depicted in FIG. 2. Further, the area of each segmented side anodes 410 is smaller than the area of the side anode 130, resulting in lower leakage current.

FIG. 5 provides a schematic plan view of a semiconductor detector 500. The semiconductor detector 500 may be similar in various respects to the semiconductor detector 110 of FIGS. 1 and 2. However, the semiconductor detector 500 includes segmented side anodes 510. In various embodiments, the semiconductor detector 500, for example, may form a part of the detector system 100 or be used in conjunction with the detector system 100. Each segmented side anode 510 of the semiconductor detector 500 extends along half of one side of the semiconductor detector 500, or along three edge pixelated anodes 515. Each segmented side anode 510 is in electrical communication with a corresponding channel 511. The channels 511 may be used to provide signals from the segmented side anodes 510 to one or more processors (e.g., processing unit 120). Each segmented side anode 510 of the embodiment of FIG. 5 is used to generate non-collected charge signals for three pixelated anodes, in contrast to the side anode segments 410 of FIG. 4 that are each used to generate non-collected charge signals for 6 pixelated anodes. Accordingly, the probability of random coincidence is lower for the embodiment depicted in FIG. 5 than for the embodiment depicted in FIG. 4. Further, the area of each segmented side anodes 510 is smaller than the area of the segmented side anodes 410, resulting in lower leakage current for each anode.

Figure 6:
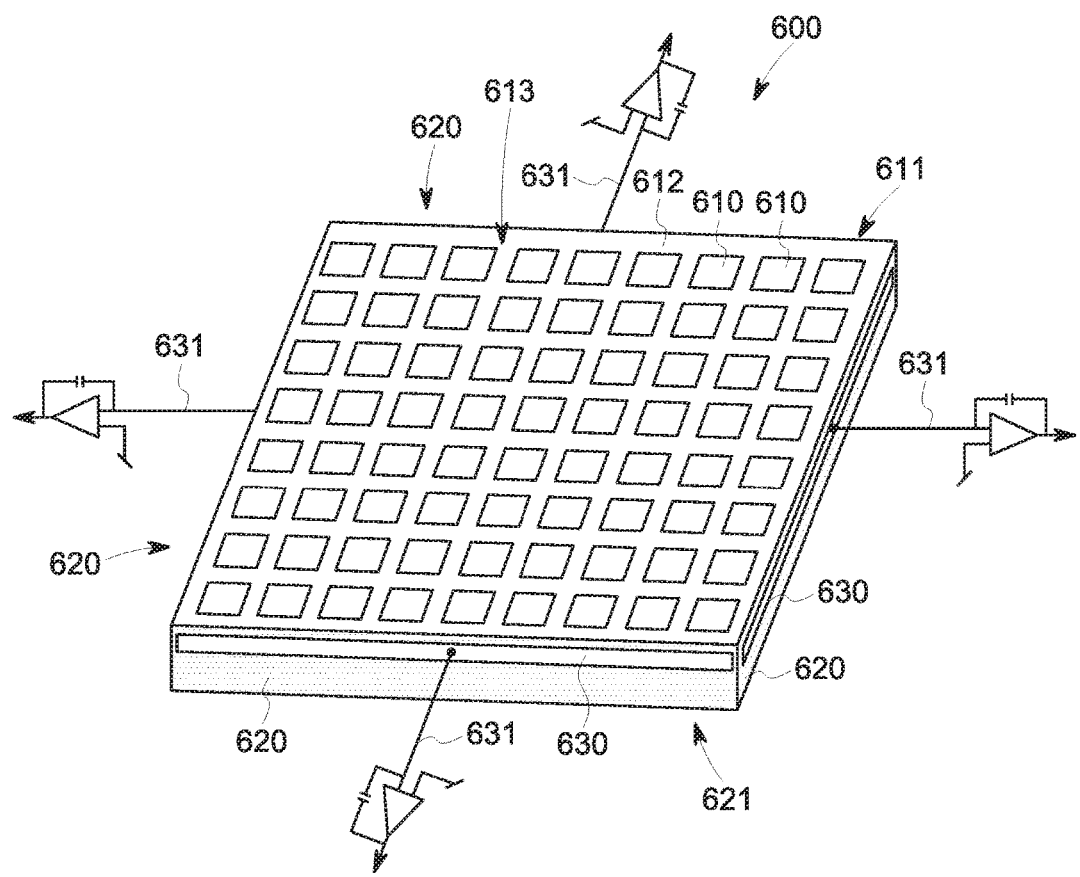
FIG. 6 provides a schematic view of a radiation detector in accordance with an embodiment.

In some embodiments, one or more side anodes may be disposed on a sidewall of a detector. For example, if the semiconductor material (e.g., CZT) is diced to its final size after the application of pixelated anodes, a predetermined photolithography or evaporation mask may not be used to produce the contact geometry because the location of the CZT edges may not known at the production stage of application of contacts. Accordingly, in various embodiments, a non-collecting electrode or electrodes (e.g., side anode or segmented side anodes) may be applied at sidewalls of the detector proximate the CZT edges. For example, FIG. 6 illustrates an example semiconductor detector 600 in accordance with various embodiments. The semiconductor detector 600 may be similar in various respects to the semiconductor detector 110 of FIGS. 1 and 2; however, the semiconductor detector 600 includes side anodes disposed on sidewalls of the semiconductor detector 600. In various embodiments, the semiconductor detector 600, for example, may form a part of the detector system 100 or be used in conjunction with the detector system 100.

As seen in FIG. 6, the semiconductor detector 600 includes pixelated anodes 610 arranged in a grid 611 and disposed on a surface 612 defining a pixel plane 613. The semiconductor detector 600 also includes sidewalls 620 oriented perpendicularly to the surface 612, with the sidewalls 620 defining sidewall planes 621 that are oriented perpendicularly to the surface 6123 and perpendicularly to the pixel plane 613. The semiconductor detector 600 includes four sidewalls 620 defining a generally square shape surrounding the grid 611 of pixelated anodes 610. Also, the semiconductor detector 600 includes side anodes 630, with each side anode 630 disposed on a corresponding sidewall 620. Each side anode 630 is electrically coupled to a corresponding channel 631. The channels 631 may be used to provide signals from the side anodes 630 to one or more processors (e.g., processing unit 120). It may be noted that, in FIG. 6, one side anode per side wall is shown; however, segmented side anodes (see, e.g., FIG. 5 and related discussion) may be employed in various embodiments. To reduce the leakage current through side anodes 620, the side anodes 620 may be biased by a potential that is lower than the potential at which anodes 610 are biased. Additionally or alternatively, the side anodes 620 may be applied on a top of an electrically insulative layer such as a passivation layer or other electrically isolating layer.

Figure 7:
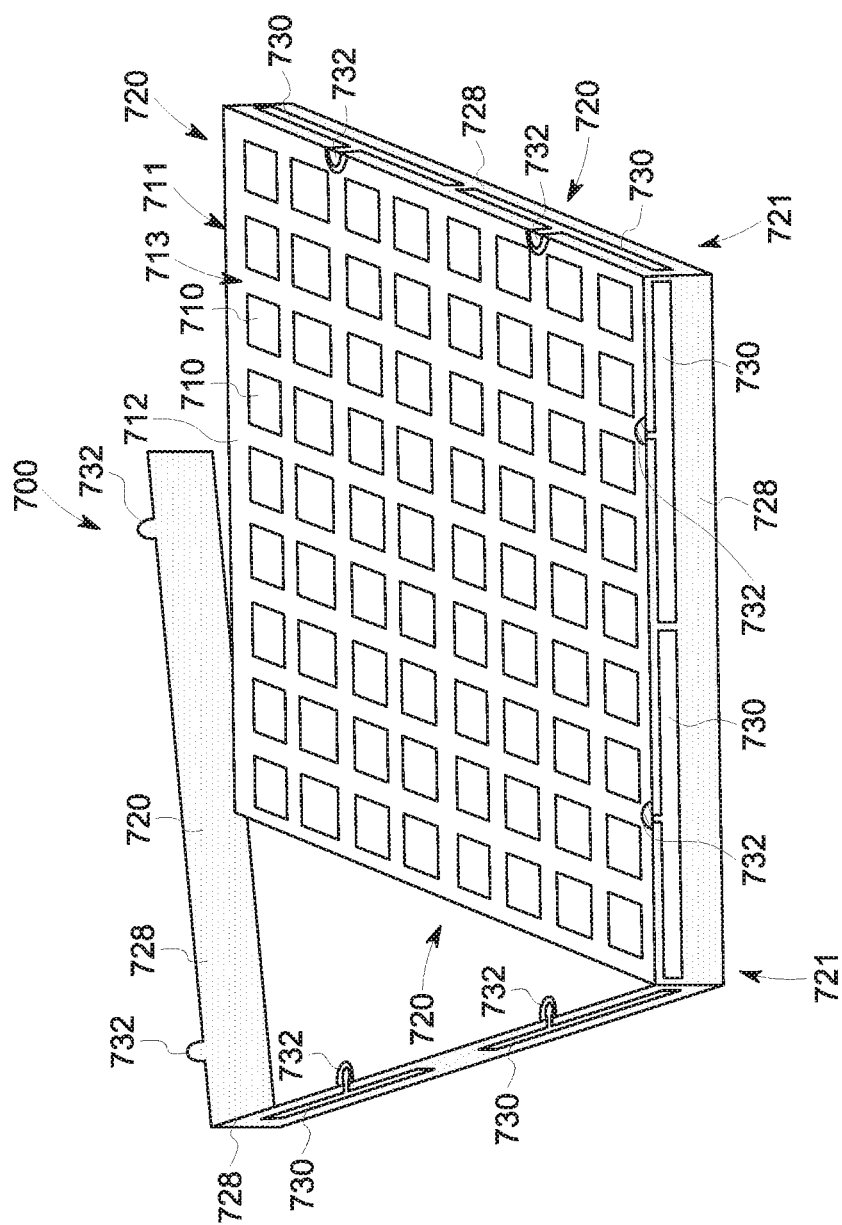
FIG. 7 provides a schematic view of a radiation detector in accordance with an embodiment.

In some embodiments, to help maintain a lower leakage current in the side anode (or side anodes), the side anode (or side anodes) may applied on a passivation or otherwise insulating layer to produce a capacitance-coupling electrode. For example, one or more side anodes may be disposed on an intermediate layer interposed between the side anode(s) and a corresponding sidewall. FIG. 7 illustrates an example radiation detector 700 in accordance with various embodiments. The semiconductor detector 700 may be similar in various respects to the semiconductor detector 110 of FIGS. 1 and 2; however, the semiconductor detector 700 includes side anodes disposed on sidewalls of the semiconductor detector 700. In various embodiments, the semiconductor, for example, may form a part of the detector system 100 or be used in conjunction with the detector system 100.

As seen in FIG. 7, the semiconductor detector 700 includes pixelated anodes 710 arranged in a grid 711 and disposed on a surface 712 defining a pixel plane 713. The semiconductor detector 700 also includes sidewalls 720 oriented perpendicularly to the surface 712, with the sidewalls 720 defining sidewall planes 721 that are oriented perpendicularly to the pixel plane 713. The semiconductor detector 700 includes four sidewalls 720 defining a generally square shape surrounding the grid 711 of pixelated anodes 710. Also, the semiconductor detector 700 includes intermediate layers 728, with each intermediate layer 728 disposed on and covering a corresponding sidewall 720 in the illustrated embodiment. Examples of intermediate layers 728 include guard bands, passivation layers, sprayed insulating layers, painted insolating layers, insulating sheets, or insulating tapes, among others. As another example, the intermediate layers 728 may be evaporated or printed on the corresponding sidewall 720. In the illustrated embodiment, two of the intermediate layers 728 are depicted as attached to corresponding sidewalls 720 while two other intermediate layers 728 are depicted as separated from corresponding sidewalls or in the process of being applied to sidewalls 720.

As seen in FIG. 7, the semiconductor detector also includes side anodes 730, with each side anode 730 disposed on a corresponding intermediate layer 728 interposed between the side anode 730 and the corresponding sidewall 720. In the particular embodiment depicted in FIG. 7, there are two segmented side anodes 730 per side of the semiconductor detector 700; however, other numbers or arrangements of side anodes may be employed in various alternate embodiments. Each side anode 730 is electrically coupled to a corresponding channel (not shown in FIG. 7). The channels may be used to provide signals from the side anodes 730 to one or more processors (e.g., processing unit 120). In the illustrated embodiment, each side anode 730 is coupled to a corresponding channel via a corresponding side anode contact 732. The side anode contacts 732 are disposed in the pixel plane 713, with each side anode contact 732 in electrical communication with the corresponding side anode 730, and configured to place the side anode 730 in electrical communication with the corresponding channel. For example, the side contact anodes 732 may be folded onto the pixel plane 713 and electrically connected to corresponding electronic channels via interconnection contacts similar to those used for the pixelated anodes 710. Applying a non-collecting electrode (e.g., side anode 730) on an electrically insulating layer (e.g., intermediate layer 728) creates a capacitance-coupling electrode, which reduces the leakage current collected by the electrode.

It may be noted that various embodiments discussed herein relate to the determination of sub-pixel locations for events. Generally, sub-pixel locations may be achieved virtually by accurate positioning of events in virtual sub-pixels, which may be used to improve intrinsic resolution and improve energy resolution. Additional discussion regarding sub-pixels may be found, for example, in U.S. patent application Ser. No. 14/627,436, entitled "Systems and Methods for Improving Energy Resolution by Sub-Pixel Energy Calibration," filed 20 Feb. 2015, and U.S. patent application Ser. No. 15/280,640, entitled "Systems and Methods for Sub-Pixel Location Determination," filed 29 Sep. 2016, which are hereby incorporated by reference in their entirety.

In various embodiments, a sub-pixel position of an event for a given pixel (e.g., a distance of the sub-pixel position from a center of the pixel) may be expressed, for example, in terms of x, y, and z coordinates. The z-coordinate, for example, may be determined using conventional methods to determine a depth-of-interaction (DOI). X and Y coordinates may be determined, for example, using the formula previously discussed based on non-collected signals from the pixels adjacent to the pixel for which a collected signal is obtained. The non-collected signals appear in pixels in which no photon is absorbed during an acquisition time period, with the non-collected signals induced by the moving charge in the pixel in which the photon was absorbed.

Figure 8:
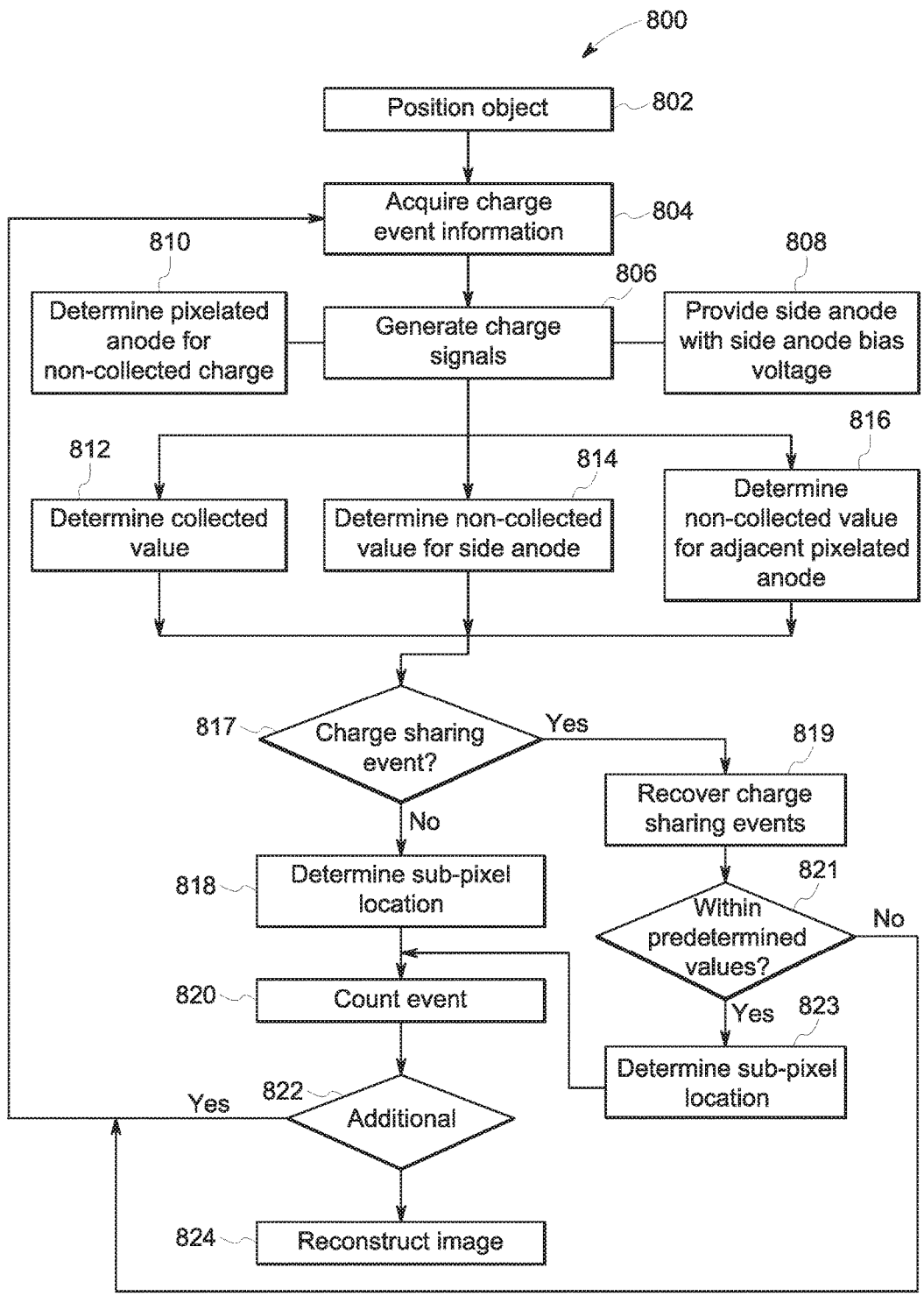
FIG. 8 shows a flowchart of a method, according to an embodiment.

FIG. 8 provides a flowchart of a method 800 for imaging including determination of sub-pixel locations for events (e.g., events corresponding to radiation emitted by an object to be imaged), in accordance with various embodiments. The method 800, for example, may employ or be performed by structures or aspects of various embodiments (e.g., systems and/or methods and/or process flows) discussed herein. In various embodiments, certain steps may be omitted or added, certain steps may be combined, certain steps may be performed concurrently, certain steps may be split into multiple steps, certain steps may be performed in a different order, or certain steps or series of steps may be re-performed in an iterative fashion. In various embodiments, portions, aspects, and/or variations of the method 800 may be able to be used as one or more algorithms to direct hardware (e.g., one or more aspects of the processing unit 120 of FIG. 1) to perform one or more operations described herein. For ease of description, aspects of the method 800 are described herein with reference to a single pixel or single group of adjacent pixels. The general principles may be applied to multiple pixels or groups of adjacent pixels of a detector system.

At 802, an object to be imaged is positioned proximate a detector system. The object may be for example, a human patient or a portion thereof that has been administered a radiopharmaceutical. Radiation emitted from the patient may be detected by the detector system to provide information from which a nuclear medicine image (e.g., a PET image, a SPECT image, a NM image) is to be reconstructed.

At 804, charge event information is acquired by a radiation detector (e.g., a semiconductor detector) of the detector system. The radiation detector includes plural pixelated anodes (which may be referred to as pixels herein) disposed on a surface of the radiation detector defining a grid having a footprint, and a side anode (or side anodes) disposed outside of the footprint defined by the plural pixelated anodes. The side anode has a length extending along at least two of the pixelated anodes. Charge events may result in at least two different types of charges within anodes—a collected charge corresponding to photon impact on the given anode, and a non-collected charge corresponding to photon impact on an anode immediately adjacent to the given anode. For example, a photon impact in a pixelated anode located on an edge of the grid, or adjacent to the side anode, may result in a non-collected charge generated by the side anode. In some embodiments, the side anode generates only non-collected charge signals, and is not used to generate collected charge signals. In addition, charge events may be produced by charge splitting between two anodes in a case known as a charge sharing event, with charge sharing events distinguished from the non-collected charge event.

At 806, charge signals are generated by a detector system experiencing a charge event (e.g., a charge generated responsive to photon impact on a given pixel or anode). The charge signals, for example, may include or be formed of a collected charge signal corresponding to charge collected by a given anode due to a photon impact on the given anode, and a non-collected charge signal corresponding to an induced charge collected by the side anode due to a photon impact on the given pixel, which, in the presently discussed example, is adjacent to the side anode. Further, additional non-collected charge signals may be generated. For example, one or more pixelated anode non-collected charge signals corresponding to an induced charge collected by one or more pixelated anodes that are adjacent to the photon-impacted anode may be generated. As discussed herein, a charge appearing simultaneously on two adjacent anodes may also be the result of charge-shared event. In various embodiments, at 808, the side anode is provided with a side anode bias voltage that is lower than a pixelated anode bias voltage provided to the pixelated anodes. Use of a lower bias voltage for the side anode in various embodiments provides reduced leakage current of the side anode. It may be noted that timing information may be used to help insure that any non-collected charge signals generated by the side anode are used with the appropriate pixelated anode generating a collected charge. In the illustrated embodiment, at 810, it is determined for which pixelated anode to use the non-collected charge signal generated by the side anode based on a time of generation of the non-collected charge signal. For example, the non-collected charge signal generated by the side anode may be used in connection with a collection charge signal generated by a pixelated anode at the same time (or within a threshold time range).

At 812, 814, and 816, various charge values are determined. In the illustrated embodiment, at 812, a collected value is determined for the collected charge signal in the pixelated anode. At 814, a non-collected value is determined for the non-collected charge signal generated by the side anode. At 816, a pixelated anode non-collected value (or values) is determined for the pixelated anode non-collected charge signal (or signals) generated by adjacent pixelated anodes. The non-collected charge signal appears simultaneously with the collected charge signal and it may be identified by its much lower value in comparison to the value of the collected charge signal. It may be noted that one or more techniques for determining charge values may be employed which are described in U.S. patent application Ser. No. 14/627,436, entitled "Systems and Methods for Improving Energy Resolution by Sub-Pixel Energy Calibration," filed 20 Feb. 2015; U.S. patent application Ser. No. 14/724,022, entitled "Systems and Methods for Charge-Sharing Identification and Correction Using a Single Pixel," filed 28 May 2015; and U.S. patent application Ser. No. 15/280,640, entitled "Systems and Methods for Sub-Pixel Location Determination," filed 29 Sep. 2016, which are hereby incorporated by reference in their entirety.

In the illustrated embodiment, at 817, a check is performed to verify whether an event being analyzed is a case of charge shared or charge sharing event. For example, the check may be performed according to the criterion discussed herein (e.g., in the case when more than two events appear simultaneously in more than two adjacent pixels, the case does not include charge shared event.) If the current event being analyzed is determined to be a charge shared event, a charge sharing recovery process is conducted at 819 of the illustrated embodiment by summing the signals from the two adjacent pixels where the signals appear simultaneously. Next, at 821, the summed energy produced at 819 is checked to verify that it matches the energy range of the photons used for the imaging. If the energy sum at 819 does not match the energy range of the photons, no event is counted and the process continues to step 804. If the energy sum at 819 does match the energy range of the photons, the sub-pixel location of the event may be determined on a splitting line (see, e.g., FIG. 2) at the center between the adjacent pixels The process may then continue to 820. In case that the checked event at 817 was found to be other than charge shared event, the process continues at 818.

At 818, the non-collected value (or values) is used to determine a sub-pixel location for an anode (or pixel) impacted by a photon. For example, using the formula discussed above, the non-collected value from the side anode may be used to determine a distance with respect to the center of the adjacent pixel for the event. One or more additional non-collected values from one or more adjacent pixelated anodes may be used in conjunction with the non-collected value from the side anode. Further, in some embodiments, non-collected values from more than one side anode may be used (e.g., for a corner pixel, a non-collected value from a first side anode extending along a first side of the corner pixel, and a non-collected value from a second side anode extending along a second side of the corner pixel.

At 820, the collected value for the given pixel is used to count an event for that pixel. The count is associated with the determined sub-pixel location, and may be accumulated with other counts for the same sub-pixel location (or within a predetermined range of the sub-pixel location). It may be noted that the non-collected charges from adjacent pixels (e.g., the side anode and/or one or more adjacent pixelated anodes) are used in the illustrated embodiment to determine a sub-pixel location for the event counted at 820.

At 822, it is determined if additional imaging information is to be acquired. If so, the method 800 returns to 804. If not, the method 800 proceeds to 824. At 824, an image is reconstructed. For example, all counted events for all pixels over a scanning period may be used to reconstruct an image, with each counted event used at its corresponding determined sub-pixel location.

Figure 9:
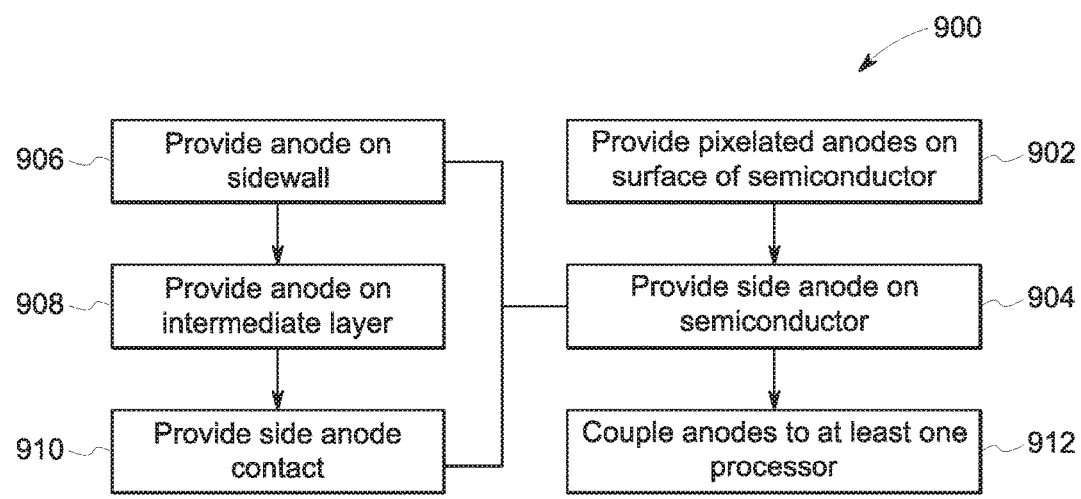
FIG. 9 shows a flowchart of a method, according to an embodiment.

FIG. 9 provides a flowchart of a method 900 for providing a semiconductor detector system, in accordance with various embodiments. The method 900, for example, may employ or be performed by structures or aspects of various embodiments (e.g., systems and/or methods and/or process flows) discussed herein. In various embodiments, certain steps may be omitted or added, certain steps may be combined, certain steps may be performed concurrently, certain steps may be split into multiple steps, certain steps may be performed in a different order, or certain steps or series of steps may be re-performed in an iterative fashion. In various embodiments, portions, aspects, and/or variations of the method 900 may be able to be used as one or more algorithms to direct hardware (e.g., one or more aspects of the processing unit 120 of FIG. 1) to perform one or more operations described herein.

At 902, plural pixelated anodes are provided on a surface of semiconductor (e.g., a surface opposed to a surface on which one or more cathodes are disposed). The plural pixelated anodes are arranged in a grid defining a footprint. The pixelated anodes are configured to generate a collected charge signal corresponding to charge collected by a given pixelated anode due to a photon impact with the pixelated anode. The pixelated anodes may also be configured to generate non-collected charge signals corresponding to photon impacts with adjacent pixelated anodes.

At 904, a side anode is provided on the semiconductor. The side anode is disposed outside of the footprint defined by the plural pixelated anodes. The side anode has a length extending along at least two of the pixelated anodes. The side anode is configured to generate a side anode non-collected charge signal corresponding to a charge collected by an adjacent pixelated anode due to a photon impact with the adjacent pixelated anode. In some embodiments, the side anode is configured to generate only non-collected charge signals and not to generate collected charge signals. It may further be noted that, in various embodiments, more than one side anode may be provided on the semiconductor. In some embodiments, the side anode is configured to operate at a side anode bias voltage that is lower than pixelated anode bias voltage as discussed herein.

In various embodiments, a single side anode may surround the entire footprint (e.g., all four sides of a rectangle or square defined by the grid of pixelated anodes. In other embodiments, each side anode may extend along an entire side of the detector. In still other embodiments, plural segmented detectors may be disposed along different portions of a side of the detector. It may be noted that the side anode(s) may be formed at or near the same time as the pixelated anodes (e.g., in connection with photolithography or an evaporative mask), for example in embodiments where the semiconductor is diced to its final size prior to application of the pixelated anodes. Alternatively, the side anode(s) may be formed as part of a separate later process, for example, where the semiconductor is diced to its final size after application of the pixelated anodes.

In the illustrated embodiment, at 906, the side anode is provided on a sidewall of the detector. The sidewall defines a sidewall plane that is perpendicular to a pixel plane defined by the pixelated anodes. For example, the semiconductor may be diced to its final size, and the pixelated anodes then provided in the pixel plane. The side anode may then be provided on the sidewall. It may be noted that in some embodiments, the side anode is disposed directly on the sidewall, while in other embodiments the side anode is disposed indirectly on the sidewall (e.g., with an intermediate layer interposed between the sidewall and the side anode).

For example, in the illustrated embodiment, at 908, the side anode is provided on an intermediate layer interposed between the side anode and the sidewall. In some embodiments, the intermediate layer may first be provided on the sidewall and the side anode subsequently provided on the intermediate layer, while in other embodiments the side anode may first be provided on the intermediate layer and the intermediate layer than positioned on the sidewall. The intermediate layer in various embodiments has electrically insulating properties, for example to reduce the leakage current of the side anode. The intermediate layer (e.g., a guard band, passivation layers, or otherwise insulating layer) may be provided on the sidewall, for example, by passivating, spraying, brushing or otherwise painting, by printing, by evaporating, or by being applied as a sheet or tape, for example. At 910 of the illustrated embodiment, a side anode contact is disposed in the pixel plane and electrically coupled to the side anode. The side anode at 904 may be provided by one or more of the steps 904 or 906 to form the side anode directly on the semiconductor either on the sidewalls or on the pixel plane, respectively. Alternatively, the side anode at 904 may be provided, by one of the combinations including steps 906 and 908 or steps 910 and 908 to form the side anode on top of an insulating layer on the sidewalls or, further alternatively, on top of an insulating layer on the pixel plane.

At 912, each of the pixelated anodes and the side anode (or side anodes) are coupled to at least one processor (e.g., processing unit 120). For example, each pixelated and side anode may have a dedicated channel or link placing that particular anode in electrical communication with the at least one processor so that charge signals generated by the various anodes may be received by the at least one processor and used based on the particular anode's location to determine event counts and sub-pixel locations as discussed herein.

It may be noted that in a situation when in step 817 of flowchart 800 of FIG. 8, the event is identified as charge shared event then the recovery process of the charge sharing 819 may be replaced by an alternative process, such as the process disclosed in U.S. patent application Ser. No. 14/724, 022, entitled "Systems and Methods for Charge-Sharing Identification and Correction Using a Single Pixel," filed 28 May 2015, which is incorporated herein by references. It may further be noted that various embodiments discussed herein provide for the identification of a shared charge event using information from only one pixelated anode instead of information from both pixelated anodes sharing the event. Accordingly, noise is reduced, as only noise from one of the pixels instead of noise from both of the pixels may affect an analyzed signal. Further, because the non-collected signal is measured or detected along with the collected signal, even small non-collected signals may pass the threshold level along with the collected signal, providing more information regarding charge-sharing events. Further still, because only information from one pixel is utilized, there is no need for time-coincidence analysis and verification of signals from two different pixels, nor any need to perform summing or mapping of neighboring pixels to identify a charge sharing event. Further, surface-recombination loss is reduced or eliminated in various embodiments. Additionally, with the signal analyzed being generated by a single pixel, the analysis is not affected by signals of adjacent pixels include random coincidence signals. Also, various embodiments may be more easily implemented inside an ASIC of a detector, as computational requirements are reduced (for example, by not requiring analysis of time-coincidence of signals from adjacent pixels).

Figure 10:
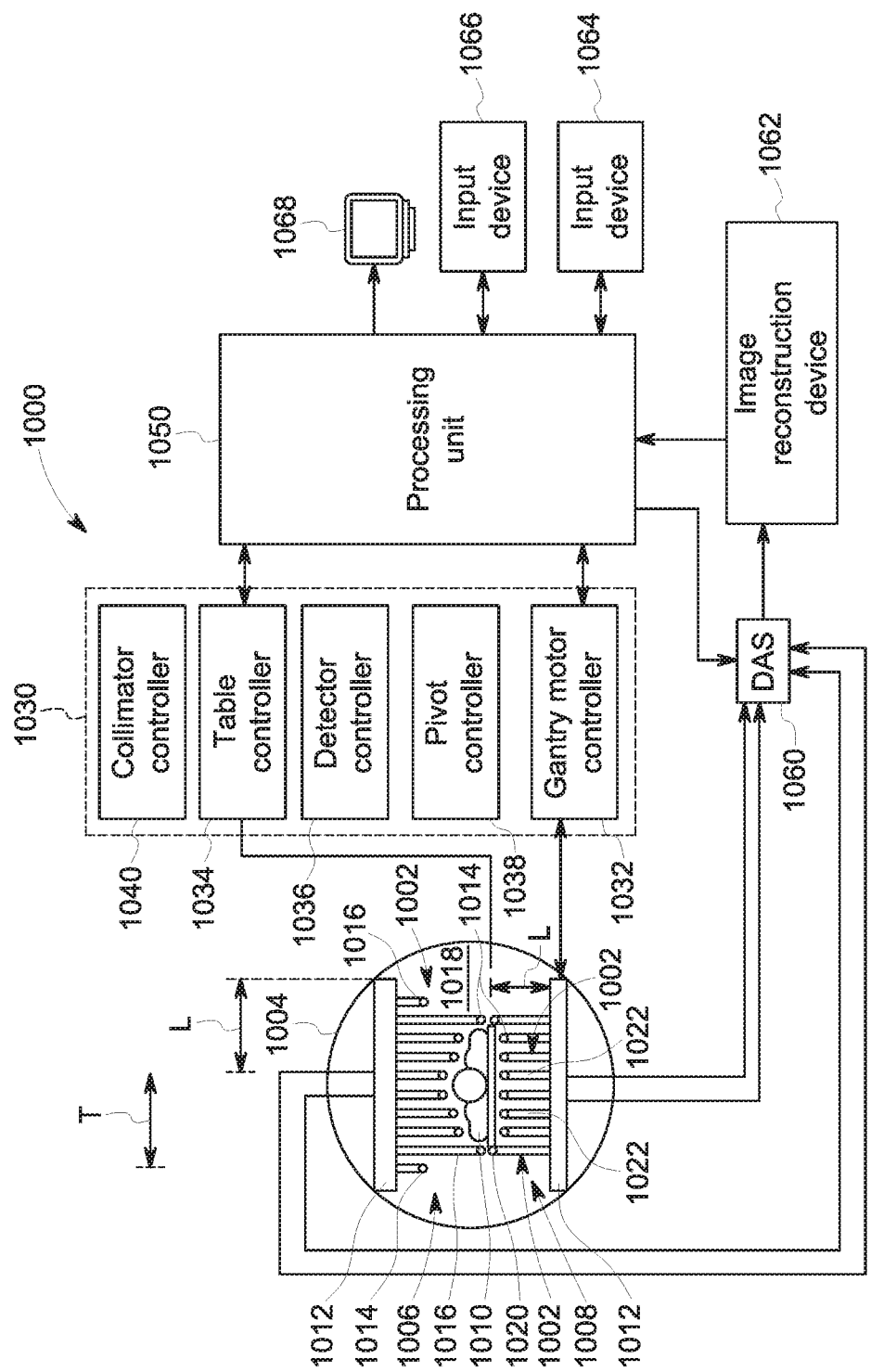
FIG. 10 shows a schematic view of an imaging system, according to an embodiment.

The invention described above and illustrated by the various figures discussed herein may be implemented in medical imaging systems, such as, for example, SPECT, SPECT-CT, PET and PET-CT. Various methods and/or systems (and/or aspects thereof) described herein may be implemented using a medical imaging system. For example, FIG. 10 is a schematic illustration of a NM imaging system 1000 having a plurality of imaging detector head assemblies mounted on a gantry (which may be mounted, for example, in rows, in an iris shape, or other configurations, such as a configuration in which the movable detector carriers 1016 are aligned radially toward the patient-body 1010). It should be noted that the arrangement of FIG. 10 is provided by way of example for illustrative purposes, and that other arrangements (e.g., detector arrangements) may be employed in various embodiments. In the illustrated example, a plurality of imaging detectors 1002 are mounted to a gantry 1004. In the illustrated embodiment, the imaging detectors 1002 are configured as two separate detector arrays 1006 and 1008 coupled to the gantry 1004 above and below a subject 1010 (e.g., a patient), as viewed in FIG. 10. The detector arrays 1006 and 1008 may be coupled directly to the gantry 1004, or may be coupled via support members 1012 to the gantry 1004 to allow movement of the entire arrays 1006 and/or 1008 relative to the gantry 1004 (e.g., transverse translating movement in the left or right direction as viewed by arrow T in FIG. 9). Additionally, each of the imaging detectors 1002 includes a detector unit 1014, at least some of which are mounted to a movable detector carrier 1016 (e.g., a support arm or actuator that may be driven by a motor to cause movement thereof) that extends from the gantry 1004. In some embodiments, the detector carriers 1016 allow movement of the detector units 1014 towards and away from the subject 1010, such as linearly. Thus, in the illustrated embodiment the detector arrays 1006 and 1008 are mounted in parallel above and below the subject 1010 and allow linear movement of the detector units 1014 in one direction (indicated by the arrow L), illustrated as perpendicular to the support member 1012 (that are coupled generally horizontally on the gantry 1004). However, other configurations and orientations are possible as described herein. It should be noted that the movable detector carrier 1016 may be any type of support that allows movement of the detector units 1014 relative to the support member 1012 and/or gantry 1004, which in various embodiments allows the detector units 1014 to move linearly towards and away from the support member 1012.

Each of the imaging detectors 1002 in various embodiments is smaller than a conventional whole body or general purpose imaging detector. A conventional imaging detector may be large enough to image most or all of a width of a patient's body at one time and may have a diameter or a larger dimension of approximately 50 cm or more. In contrast, each of the imaging detectors 1002 may include one or more detector units 1014 coupled to a respective detector carrier 1016 and having dimensions of, for example, 4 cm to 20 cm and may be formed of Cadmium Zinc Telluride (CZT) tiles or modules. For example, each of the detector units 1014 may be 8×8 cm in size and be composed of a plurality of CZT pixelated modules (not shown). For example, each module may be 4×4 cm in size and have 16×16=256 pixels (pixelated anodes). In some embodiments, each detector unit 1014 includes a plurality of modules, such as an array of 1×7 modules. However, different configurations and array sizes are contemplated including, for example, detector units 1014 having multiple rows of modules.

It should be understood that the imaging detectors 1002 may be different sizes and/or shapes with respect to each other, such as square, rectangular, circular or other shape. An actual field of view (FOV) of each of the imaging detectors 1002 may be directly proportional to the size and shape of the respective imaging detector.

The gantry 1004 may be formed with an aperture 1018 (e.g., opening or bore) passing through the gantry 1004 as illustrated. A patient table 1020, such as a patient bed, is configured with a support mechanism (not shown) to support and carry the subject 1010 in one or more of a plurality of viewing positions within the aperture 1018 and relative to the imaging detectors 1002. Alternatively, the gantry 1004 may comprise a plurality of gantry segments (not shown), each of which may independently move a support member 1012 or one or more of the imaging detectors 1002.

The gantry 1004 may also be configured in other shapes, such as a "C", "H" and "L", for example, and may be rotatable about the subject 1010. For example, the gantry 1004 may be formed as a closed ring or circle, or as an open arc or arch which allows the subject 1010 to be easily accessed while imaging and facilitates loading and unloading of the subject 1010, as well as reducing claustrophobia in some subjects 1010.

Additional imaging detectors (not shown) may be positioned to form rows of detector arrays or an arc or ring around the subject 1010. By positioning multiple imaging detectors 1002 at multiple positions with respect to the subject 1010, such as along an imaging axis (e.g., head to toe direction of the subject 1010) image data specific for a larger FOV may be acquired more quickly.

Each of the imaging detectors 1002 has a radiation detection face, which is directed towards the subject 1010 or a region of interest within the subject.

The collimators 1022 (and detectors) in FIG. 10 are depicted for ease of illustration as single collimators in each detector head. Optionally, for embodiments employing one or more parallel-hole collimators, multi-bore collimators may be constructed to be registered with pixels of the detector units 1014, which in one embodiment are CZT detectors. However, other materials may be used. Registered collimation may improve spatial resolution by forcing photons going through one bore to be collected primarily by one pixel. Additionally, registered collimation may improve sensitivity and energy response of pixelated detectors as detector area near the edges of a pixel or in-between two adjacent pixels may have reduced sensitivity or decreased energy resolution or other performance degradation. Having collimator septa directly above the edges of pixels reduces the chance of a photon impinging at these degraded-performance locations, without decreasing the overall probability of a photon passing through the collimator.

A controller unit 1030 may control the movement and positioning of the patient table 1020, imaging detectors 1002 (which may be configured as one or more arms), gantry 1004 and/or the collimators 1022 (that move with the imaging detectors 1002 in various embodiments, being coupled thereto). A range of motion before or during an acquisition, or between different image acquisitions, is set to maintain the actual FOV of each of the imaging detectors 1002 directed, for example, towards or "aimed at" a particular area or region of the subject 1010 or along the entire subject 1010. The motion may be a combined or complex motion in multiple directions simultaneously, concurrently, or sequentially.

The controller unit 1030 may have a gantry motor controller 1032, table controller 1034, detector controller 1036, pivot controller 1038, and collimator controller 1040. The controllers 1030, 1032, 1034, 1036, 1038, 1040 may be automatically commanded by a processing unit 1050, manually controlled by an operator, or a combination thereof. The gantry motor controller 1032 may move the imaging detectors 1002 with respect to the subject 1010, for example, individually, in segments or subsets, or simultaneously in a fixed relationship to one another. For example, in some embodiments, the gantry controller 1032 may cause the imaging detectors 1002 and/or support members 1012 to move relative to or rotate about the subject 1010, which may include motion of less than or up to 180 degrees (or more).

The table controller 1034 may move the patient table 1020 to position the subject 1010 relative to the imaging detectors 1002. The patient table 1020 may be moved in up-down directions, in-out directions, and right-left directions, for example. The detector controller 1036 may control movement of each of the imaging detectors 1002 to move together as a group or individually. The detector controller 1036 also may control movement of the imaging detectors 1002 in some embodiments to move closer to and farther from a surface of the subject 1010, such as by controlling translating movement of the detector carriers 1016 linearly towards or away from the subject 1010 (e.g., sliding or telescoping movement). Optionally, the detector controller 1036 may control movement of the detector carriers 1016 to allow movement of the detector array 1006 or 1008. For example, the detector controller 1036 may control lateral movement of the detector carriers 1016 illustrated by the T arrow (and shown as left and right as viewed in FIG. 10). In various embodiments, the detector controller 1036 may control the detector carriers 1016 or the support members 1012 to move in different lateral directions. Detector controller 1036 may control the swiveling motion of detectors 1002 together with their collimators 1022. In some embodiments, detectors 1002 and collimators 1022 may swivel or rotate around an axis.

The pivot controller 1038 may control pivoting or rotating movement of the detector units 1014 at ends of the detector carriers 1016 and/or pivoting or rotating movement of the detector carrier 1016. For example, one or more of the detector units 1014 or detector carriers 1016 may be rotated about at least one axis to view the subject 1010 from a plurality of angular orientations to acquire, for example, 3D image data in a 3D SPECT or 3D imaging mode of operation. The collimator controller 1040 may adjust a position of an adjustable collimator, such as a collimator with adjustable strips (or vanes) or adjustable pinhole(s).

It should be noted that motion of one or more imaging detectors 1002 may be in directions other than strictly axially or radially, and motions in several motion directions may be used in various embodiment. Therefore, the term "motion controller" may be used to indicate a collective name for all motion controllers. It should be noted that the various controllers may be combined, for example, the detector controller 1036 and pivot controller 1038 may be combined to provide the different movements described herein.

Prior to acquiring an image of the subject 1010 or a portion of the subject 1010, the imaging detectors 1002, gantry 1004, patient table 1020 and/or collimators 1022 may be adjusted, such as to first or initial imaging positions, as well as subsequent imaging positions. The imaging detectors 1002 may each be positioned to image a portion of the subject 1010. Alternatively, for example in a case of a small size subject 1010, one or more of the imaging detectors 1002 may not be used to acquire data, such as the imaging detectors 1002 at ends of the detector arrays 1006 and 1008, which as illustrated in FIG. 9 are in a retracted position away from the subject 1010. Positioning may be accomplished manually by the operator and/or automatically, which may include using, for example, image information such as other images acquired before the current acquisition, such as by another imaging modality such as X-ray Computed Tomography (CT), MRI, X-Ray, PET or ultrasound. In some embodiments, the additional information for positioning, such as the other images, may be acquired by the same system, such as in a hybrid system (e.g., a SPECT/CT system). Additionally, the detector units 1014 may be configured to acquire non-NM data, such as x-ray CT data. In some embodiments, a multi-modality imaging system may be provided, for example, to allow performing NM or SPECT imaging, as well as x-ray CT imaging, which may include a dual-modality or gantry design as described in more detail herein.

After the imaging detectors 1002, gantry 1004, patient table 1020, and/or collimators 1022 are positioned, one or more images, such as three-dimensional (3D) SPECT images are acquired using one or more of the imaging detectors 1002, which may include using a combined motion that reduces or minimizes spacing between detector units 1014. The image data acquired by each imaging detector 1002 may be combined and reconstructed into a composite image or 3D images in various embodiments.

In one embodiment, at least one of detector arrays 1006 and/or 1008, gantry 1004, patient table 1020, and/or collimators 1022 are moved after being initially positioned, which includes individual movement of one or more of the detector units 1014 (e.g., combined lateral and pivoting movement) together with the swiveling motion of detectors 1002. For example, at least one of detector arrays 1006 and/or 1008 may be moved laterally while pivoted. Thus, in various embodiments, a plurality of small sized detectors, such as the detector units 1014 may be used for 3D imaging, such as when moving or sweeping the detector units 1014 in combination with other movements.

In various embodiments, a data acquisition system (DAS) 1060 receives electrical signal data produced by the imaging detectors 1002 and converts this data into digital signals for subsequent processing. However, in various embodiments, digital signals are generated by the imaging detectors 1002. An image reconstruction device 1062 (which may be a processing device or computer) and a data storage device 1064 may be provided in addition to the processing unit 1050. It should be noted that one or more functions related to one or more of data acquisition, motion control, data processing and image reconstruction may be accomplished through hardware, software and/or by shared processing resources, which may be located within or near the imaging system 1000, or may be located remotely. Additionally, a user input device 1066 may be provided to receive user inputs (e.g., control commands), as well as a display 1068 for displaying images. DAS 1060 receives the acquired images from detectors 1002 together with the corresponding lateral, vertical, rotational and swiveling coordinates of gantry 1004, support members 1012, detector units 1014, detector carriers 1016, and detectors 1002 for accurate reconstruction of an image including 3D images and their slices.

It should be noted that the particular arrangement of components (e.g., the number, types, placement, or the like) of the illustrated embodiments may be modified in various alternate embodiments. For example, in various embodiments, different numbers of a given module or unit may be employed, a different type or types of a given module or unit may be employed, a number of modules or units (or aspects thereof) may be combined, a given module or unit may be divided into plural modules (or sub-modules) or units (or sub-units), one or more aspects of one or more modules may be shared between modules, a given module or unit may be added, or a given module or unit may be omitted.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, and denotes structural requirements of any structure, limitation, or element that is described as being "configured to" perform the task or operation. For example, a processing unit, processor, or computer that is "configured to" perform a task or operation may be understood as being particularly structured to perform the task or operation (e.g., having one or more programs or instructions stored thereon or used in conjunction therewith tailored or intended to perform the task or operation, and/or having an arrangement of processing circuitry tailored or intended to perform the task or operation). For the purposes of clarity and the avoidance of doubt, a general purpose computer (even if the general purpose computer may become "configured to" perform the task or operation if appropriately programmed) is not "configured to" perform a task or operation unless or until specifically programmed or structurally modified to perform the task or operation.

As used herein, the term "computer," "processor," or "module" may include any processor-based or microprocessor-based system including systems using microcontrollers, reduced instruction set computers (RISC), application specific integrated circuits (ASICs), logic circuits, and any other circuit or processor capable of executing the functions described herein. The above examples are exemplary only, and are thus not intended to limit in any way the definition and/or meaning of the term "computer," "processor," or "module."

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments of the invention. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" may include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled.

In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A radiation detector system comprising:
a semiconductor detector having a surface;
plural pixelated anodes disposed on the surface, the pixelated anodes arranged in a grid defining a footprint; and
a side anode, the side anode disposed entirely outside of the footprint defined by the plural pixelated anodes, wherein no portion of the side anode extends into the footprint, the side anode having a length extending along at least two of the pixelated anodes, wherein the side anode is coupled to an electronic channel and configured to generate a non-collected charge signal in response to absorption of a photon in a pixelated anode disposed adjacent to the side anode.

2. The radiation detector system of claim 1, wherein each of the pixelated anodes is configured to generate, in response to absorption of a photon in the corresponding pixelated anode, a collected charge signal corresponding to a charge collected by the pixelated anode, and to generate, in response to the absorption of a photon in an adjacent anode, a non-collected charge signal corresponding to a charge collected by the adjacent anode to the pixelated anode, wherein the side anode is configured to generate a side anode non-collected charge signal corresponding to a charge collected by an adjacent anode to the side anode, the radiation detector system further comprising:
at least one processor operably coupled to the pixelated anodes and to the side anode, the at least one processor comprising a tangible and non-transitory memory having stored thereon instructions configured to direct the at least one processor to:
determine a collected value for a collected charge signal in a pixelated anode disposed adjacent to the side anode;
determine a non-collected value for the corresponding side anode non-collected charge signal in the at least one side anode corresponding to the charge collected by the pixelated anode disposed adjacent to the side anode;
use the non-collected value for the side anode non-collected charge signal to determine a sub-pixel location for the pixelated anode disposed adjacent to the side anode; and
use the collected value to count a single event in the pixelated anode.

3. The radiation detector system of claim 2, wherein the at least one processor is configured to determine only non-collected values for the at least one side anode.

4. The radiation detector system of claim 3, wherein the side anode has a side anode bias voltage that is lower than a pixelated anode bias voltage.

5. The radiation detector system of claim 2, wherein the at least one processor is further configured to distinguish between shared charge events and non-collected events.

6. The radiation detector system of claim 1, wherein the side anode is disposed directly on a sidewall of the semiconductor detector, the sidewall defining a sidewall plane that is perpendicular to a pixel plane defined by the pixelated anodes.

7. The radiation detector system of claim 1, wherein the side anode is disposed on an intermediate layer interposed between the side anode and a sidewall of the semiconductor detector, the sidewall defining a sidewall plane that is perpendicular to a pixel plane defined by the pixelated anodes.

8. The radiation detector system of claim 7, further comprising a side anode contact disposed in the pixel plane and electrically coupled to the side anode.

9. The radiation detector system of claim 1, further comprising a plurality of segmented side anodes.

10. A method comprising:
acquiring charge event information with a radiation detector comprising plural pixelated anodes disposed on a surface of the radiation detector defining a grid having a footprint;
generating, for a charge event, charge signals comprising a collected charge signal corresponding to a charge collected by a pixelated anode and a non-collected charge signal corresponding to a charge collected by a side anode, the side anode disposed entirely outside of the footprint defined by the plural pixelated anodes and having a length extending along at least two of the pixelated anodes, wherein no portion of the side anode extends into the footprint;
determining, with at least one processor, a collected value for the collected charge signal in the pixelated anode;
determining, with the at least one processor, a non-collected value for the non-collected charge signal generated by the side anode;
using the non-collected value for the non-collected charge signal to determine a sub-pixel location for the pixelated anode; and
using the collected value to count a single event in the pixelated anode.

11. The method of claim 10, further comprising providing a side anode bias voltage to the side anode, wherein the side anode bias voltage is lower than a pixelated anode bias voltage provided to the pixelated anode.

12. The method of claim 10, wherein the side anode is used to generate the non-collected charge signal and is not used to generate any collected charge signals.

13. The method of claim 10, further comprising determining for which pixelated anode to use the non-collected charge signal generated by the side anode based on a time of generation of the non-collected charge signal.

14. The method of claim 10, further comprising:
generating, for the charge event, a pixelated anode non-collected charge signal corresponding to a charge collected by an adjacent pixelated anode;
determining, with the at least one processor, a pixelated anode non-collected value for the pixelated anode non-collected charge signal; and
using the pixelated anode non-collected value to determine the sub-pixel location for the pixelated anode.

15. A method comprising:
providing plural pixelated anodes on a surface of a semiconductor, the plural pixelated anodes arranged in a grid defining a footprint; and providing a side anode on the semiconductor, the side anode disposed entirely outside of the footprint defined by the plural pixelated anodes and having a length extending along at least two of the pixelated anodes, wherein no portion of the side anode extends into the footprint, wherein the side anode is coupled to an electronic channel and configured to generate a non-collected charge signal in response to absorption of a photon in a pixelated anode disposed adjacent to the side anode.

16. The method of claim 15, further comprising coupling the pixelated anodes and the side anode to at least one processor, wherein each of the pixelated anodes is configured to generate a collected charge signal corresponding to a charge collected by the pixelated anode and to generate a non-collected charge signal corresponding to a charge collected by an adjacent anode to the pixelated anode, wherein the side anode is configured to generate a side anode non-collected charge signal corresponding to a charge collected by an adjacent anode to the side anode.

17. The method of claim 15, wherein the side anode is configured to operate at a side anode bias voltage that is lower than a pixelated anode bias voltage.

18. The method of claim 15, wherein providing the side anode comprises providing the side anode directly on a sidewall of the semiconductor detector, the sidewall defining a sidewall plane that is perpendicular to a pixel plane defined by the pixelated anodes.

19. The method of claim 15, further comprising providing the side anode on an intermediate layer interposed between the side anode and a sidewall of the semiconductor detector, the sidewall defining a sidewall plane that is perpendicular to a pixel plane defined by the pixelated anodes.

20. The method of claim 19, further comprising providing a side anode contact disposed in the pixel plane and electrically coupled to the side anode.

* * * * *